(12) United States Patent
Hammerschmidt (10) Patent No.: US 9,016,116 B1
(45) Date of Patent: Apr. 28, 2015

(54) EXTRACTION OF TIRE CHARACTERISTICS COMBINING DIRECT TPMS AND TIRE RESONANCE ANALYSIS

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/047,343

(22) Filed: Oct. 7, 2013

(51) Int. Cl.
*B60C 23/02* (2006.01)
*G01M 17/02* (2006.01)

(52) U.S. Cl.
CPC .................... *G01M 17/02* (2013.01)

(58) Field of Classification Search
USPC .................................. 73/146–146.8
See application file for complete search history.

(56) References Cited

U.S. PATENT DOCUMENTS

| | | | |
|---|---|---|---|
| 6,385,553 B1 * | 5/2002 | Naito et al. .................. | 702/138 |
| 6,584,427 B2 * | 6/2003 | Kamiya et al. ................ | 702/140 |
| 6,591,671 B2 | 7/2003 | Brown | |
| 7,205,886 B2 * | 4/2007 | Kin .............................. | 340/442 |
| 7,283,924 B2 | 10/2007 | Lauer | |
| 7,336,161 B2 | 2/2008 | Walraet | |
| 7,673,505 B2 | 3/2010 | Hammerschmidt | |
| 8,207,839 B2 | 6/2012 | Fujita | |
| 8,279,056 B2 * | 10/2012 | Fujita et al. .................. | 340/444 |
| 8,299,909 B2 * | 10/2012 | Fujita et al. .................. | 340/444 |
| 8,347,704 B2 | 1/2013 | Kawasaki | |
| 2002/0059826 A1 * | 5/2002 | Ono et al. .................... | 73/146.5 |
| 2003/0121319 A1 * | 7/2003 | Kojima et al. ................ | 73/146.2 |
| 2004/0099055 A1 | 5/2004 | Komatsu et al. | |
| 2004/0123654 A1 | 7/2004 | Komatsu et al. | |
| 2004/0140042 A1 * | 7/2004 | Teratani et al. ............. | 156/110.1 |
| 2005/0139000 A1 * | 6/2005 | Walenty et al. .............. | 73/146.5 |
| 2005/0235744 A1 | 10/2005 | Ogawa | |
| 2007/0186634 A1 * | 8/2007 | Burghardt et al. ............ | 73/146 |

(Continued)

FOREIGN PATENT DOCUMENTS

| | | |
|---|---|---|
| JP | H05133831 | 5/1993 |
| JP | H09323515 A | 12/1997 |
| WO | WO2006100577 A1 | 9/2006 |

OTHER PUBLICATIONS

Non-Final Office Action dated Feb. 18, 2015 for U.S. Appl. No. 14/047,343.

*Primary Examiner* — Andre Allen
(74) *Attorney, Agent, or Firm* — Eschweiler & Associates, LLC (57) ABSTRACT

Embodiments relate to tire characterization systems and methods for combining direct tire pressure monitoring systems (TPMS) and tire resonance analysis in indirect tire pressure monitoring systems (TPMS) for the extraction of tire characteristics to characterize other tire parameters. In embodiments, iTPMS and methods that utilize anti-lock braking system (ABS) sensed signals coupled to an electronic control unit (ECU) that may comprise circuitry and/or controllers to process the sensed signals using a resonance frequency analysis (RFA) technique can be combined with direct tire pressure sensor measurements from direct TPMS systems. Because direct TPMS systems deliver a precise value of a tire characteristic (for example, tire pressure), one of the unknown parameters that influence the resonance effects can be removed. As a results, the detected resonance can be used to characterize another tire parameter that would not be accessible without knowledge of the precise value of the tire characteristic delivered by the direct TPMS system.

20 Claims, 7 Drawing Sheets

(56) References Cited

U.S. PATENT DOCUMENTS

| | | | |
|---|---|---|---|
| 2008/0276699 A1* | 11/2008 | Edling et al. .................... | 73/146 |
| 2009/0027183 A1 | 1/2009 | Kvisteroy | |
| 2009/0105921 A1 | 4/2009 | Hanatsuka et al. | |
| 2009/0282906 A1 | 11/2009 | Kawasaki et al. | |
| 2010/0073158 A1 | 3/2010 | Uesaka et al. | |
| 2010/0087981 A1 | 4/2010 | Orozco-Perez | |
| 2010/0217542 A1* | 8/2010 | Fujita et al. .................... | 702/50 |
| 2011/0219864 A1* | 9/2011 | Yukawa et al. .............. | 73/146.3 |
| 2012/0221196 A1 | 8/2012 | Seymour et al. | |
| 2013/0035834 A1 | 2/2013 | Couch et al. | |
| 2014/0130590 A1* | 5/2014 | Nomura et al. ................. | 73/146 |

* cited by examiner

EXTRACTION OF TIRE CHARACTERISTICS COMBINING DIRECT TPMS AND TIRE RESONANCE ANALYSIS

TECHNICAL FIELD

Embodiments relate generally to direct tire pressure monitoring and indirect tire pressure monitoring, and more particularly to combining direct tire pressure monitoring and tire resonance analysis for the extraction of tire characteristics to characterize other tire parameters.

BACKGROUND

There are two general approaches to monitoring the pressure in vehicle tires: direct and indirect. Direct tire pressure monitoring systems typically comprise a wheel module having one or more sensors and electronics mounted in or to the tire to directly measure the tire's pressure and wirelessly transmit measurement data to the vehicle.

Indirect TPMSs generally utilize information from other vehicle sensors and/or systems to indirectly estimate a tire's pressure without direct TPMS sensors or electronics being located in the tire. Indirect TPMS is attractive because it can be more cost-efficient than direct TPMS. One conventional indirect TPMS uses wheel speed signals from the anti-lock brake system (ABS). For a typical passenger vehicle having four tires, the indirect TPMS compares the four wheel speed signals to determine whether a wheel is rotating faster because of a loss of pressure and related decreased diameter. One drawback to some of these indirect systems is that the systems cannot detect whether all wheels have lost pressure over time because the values are compared.

One approach for overcoming this drawback is to utilize a resonance frequency method (RFM) of analysis of a single resonance frequency in the sensed data signals from the ABS. U.S. Pat. Nos. 8,207,839 and 8,347,704 describe different kinds of RFM analysis of a time series of sensed data signals that includes auto-regression analysis, Fast Fourier analysis, a Bayesian analysis, or analysis based on a linear estimation model. While different kinds of analysis are taught by these patents, the purpose of each of these known RFM approaches is to reduce the amount of computation power required in an on-board processor to do the calculations necessary to identify a single resonance frequency from which tire pressure can be indirectly estimated. While RFM analysis can represent an improvement over conventional indirect TPMS, the accuracy of the results can be impacted by the low resolution of the ABS sensed data signals and by other factors that can influence the resonance frequency beyond just the tire pressure in an individual tire.

Therefore, in another approach, a multidimensional resonance frequency analysis (MRFA) that includes a spectral analysis identifying at least two tire vibration modes in the wheel speed signal and isolates at least one characteristic affecting the at least two tire vibration modes, for example, that described in U.S. patent application Ser. No. 13/919,620, which is herein incorporated by reference in its entirety, can also be utilized. In MRFA approaches, the number of tire parameters that can be extracted depends on the number of different resonance modes that can be identified in the spectrum of the wheel speed signal and on a significant difference of their respective dependence on the different parameters.

Moreover, typical direct TPMS and indirect TPMS do not interface with each other. Therefore, there is a need for combined direct tire pressure monitoring and tire resonance analysis for the extraction of tire characteristics in order to characterize other tire parameters.

SUMMARY

In an embodiment, a tire characterization system comprises a sensor configured to provide a wheel speed signal; a direct tire pressure monitoring system (TPMS) including at least one sensor configured to provide a direct measurement of a characteristic of the tire; and a characterization engine configured to process the wheel speed signal to identify at least one tire vibration mode and use the identified at least one tire vibration mode and the direct measurement to estimate a characterized parameter of the tire.

In an embodiment, a method of characterizing at least one parameter of a vehicle tire, the method comprises obtaining data representative of a wheel speed of the tire; analyzing the data; obtaining a direct measurement from at least one sensor corresponding to the unknown parameter; incorporating the direct measurement into the analyzed data to remove the unknown parameter; and characterizing one or more additional parameters of the vehicle tire.

In an embodiment, a tire characterization system comprises at least one sensor configured to provide at least a direct measurement of a characteristic of the tire; an wheel speed sensor configured to provide a wheel speed signal; and an electronic control unit (ECU) coupled to the wheel speed sensor and configured to process the sensed wheel speed signal, to identify at least one tire vibration mode, and process the direct measurement and the identified at least one tire vibration mode in order to estimate a characterized parameter of the tire.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to tire characterization systems and methods for combining direct tire pressure monitoring systems (TPMS) and tire resonance analysis in indirect tire pressure monitoring systems (TPMS) for the extraction of tire characteristics to characterize other tire parameters. In embodiments, TPMS and methods that utilize anti-lock braking system (ABS) sensed signals coupled to an electronic control unit (ECU) that can comprise circuitry and/or controllers to process the sensed signals using a resonance frequency analysis (RFA) technique can be combined with direct tire pressure sensor measurements from direct TPMS systems. Because direct TPMS systems deliver a precise value of a tire characteristic (for example, tire pressure), one of the unknown parameters that influence the resonance effects can be removed. As a results, the detected resonance can be used to characterize another tire parameter that would not be accessible without knowledge of the precise value of the tire characteristic delivered by the direct TPMS system. In embodiments, the addition of one or more direct measurements from the direct TPMS system into the system of equations that describes the change of the resonance characteristic generated by the RFA technique can remove one or more unknown variables in the RFA technique. In embodiments, additional direct measurements from the direct TPMS system can be incorporated. With the incorporation of additional direct measurements, additional unknown variables can be removed and additional tire parameters can be characterized from the system of equations in the RFA technique.

In embodiments, a direct TPMS provides a high quality or highly accurate pressure measurement value. In contrast to indirect TPMS systems, wherein the dependence of the resonance on the pressure must be known, the direct pressure measurement value can be used to eliminate a pressure dependence on a resonance parameter. A resonance can therefore be analyzed for its dependence on another parameter. In embodiments, the resonance can be analyzed for the temperature of the tire material, which influences the friction between the tire and the driving surface. Determining the temperature of the tire material is valuable and is often not directly measurable due to mechanical assembly challenges with sensors necessarily requiring close contact with the tire material.

In embodiments, in the case that a sensor from the direct TPMS system also provides a temperature measured in close contact with the tire material, the direct temperature measurement value can be applied to eliminate the temperature dependence on another parameter (another influence parameter in the resonance characteristic). For example, by analyzing the resonance for additional parameter dependence, after using the one or more parameters precisely and directly measured by the direct TPMS system, the identified resonance effects that are caused by the tire can be used to extract additional information about the state of the tire. In some embodiments, information related to a state of the material of the tire can be extracted. In an embodiment, estimations of a state of material age can be determined. In another embodiment, estimations of the thickness of the tire profile can be determined. In embodiments, because the dependence of the resonance behavior on the exemplary state of material age or tire profile thickness may be relatively small, the evaluation time can be long. Therefore, in embodiments, the parameters that are accessible are typically ones that change slowly.

In embodiments, in the case that the temperature provided by the direct sensor is not the real tire material temperature, a correction factor from the measured temperature to the material temperature can be calculated instead of evaluating another tire parameter.

Figure 1A:
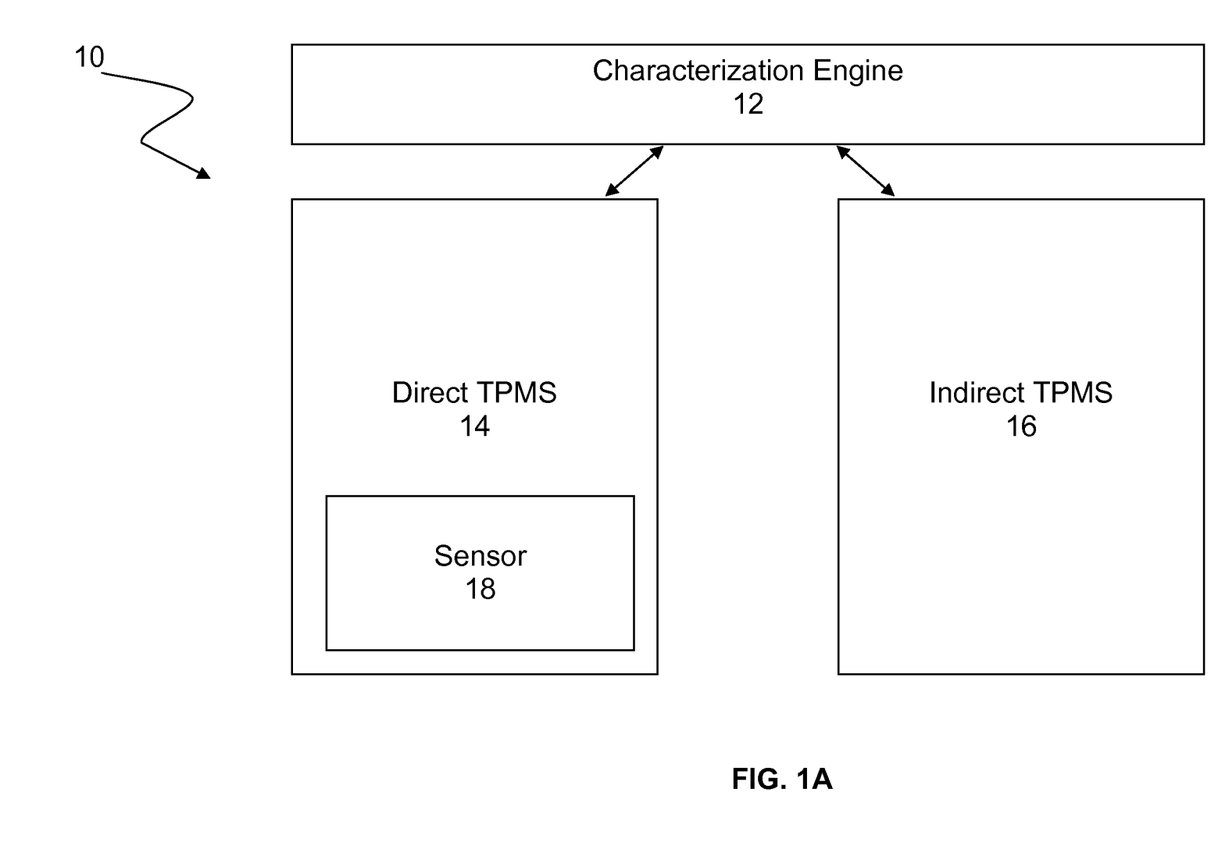
FIG. 1A is a block diagram of a tire characterization system, according to an embodiment.

Referring to FIG. 1A, a block diagram of an embodiment of a tire characterization system 10 that utilizes RFA in accordance with an embodiment is depicted. According to an embodiment, system 10 comprises characterization engine 12, direct TPMS 14, and indirect TPMS 16. In an embodiment, characterization engine 12 interfaces with direct TPMS 14 and indirect TPMS 16. Such an interface, such as a wired or wireless connection, can be provided between direct TPMS 14 and indirect TPMS 16 so as to operably couple direct TPMS 14 and indirect TPMS 16.

Characterization engine 12 generally includes, in an embodiment, a processor and memory. The characterization engine processor can be any programmable device that accepts digital data as input, is configured to process the input according to instructions or algorithms, and provides results as outputs. In an embodiment, the characterization engine processor can be a central processing unit (CPU) configured to carry out the instructions of a computer program. In other embodiments, the characterization engine processor can be a digital signal processor (DSP). The processor is therefore configured to perform basic arithmetical, logical, and input/output operations.

The characterization engine memory can comprise volatile or non-volatile memory operably coupled to the characterization engine processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the claims.

Direct TPMS 14 can include, in an embodiment, sensor 18. Sensor 18 can be any sensor or plurality of sensors configured to measure a value of a tire parameter. For example, sensor 18 can comprise a tire pressure sensor configured to measure the pressure of the tire. In embodiments, direct TPMS 14 can include additional or other sensors, such as one or more temperature sensors or one or more vibration sensors. Sensor 18 can be internal or external to the tire and can be mounted in or on, affixed to, embedded in, or otherwise coupled to the tire. In other embodiments, sensor 18 can be mounted proximate but not in or on the tire, such as on a rim, wheel, axle, vehicle body or other suitable place.

Indirect TPMS system 16 is or can include, in an embodiment, wheel speed signals for example used for an anti-lock braking system (ABS) coupled to an electronic control unit (ECU) that may comprise circuitry and/or controllers to process the sensed signals using a resonance frequency analysis (RFA) technique. The wheel speed sensor signals may for example be generated by a magnetic sensor mounted close to the wheel axis and sensing the variation of a magnetic field caused by a rotation of the wheel axis. In some embodiments, a sensor, rather than an indirect TPMS system can be configured to provide the sensed signal(s). In some embodiments, additional information from other sensed signals or stored data settings for non-tire variables and parameters can be incorporated into the RFA. In embodiments, the RFA uses a spectral analysis of tire vibrations as determined from the sensed ABS signals over different points in the spectrum that can reflect different vibration modes and different corresponding resonance frequencies. In other embodiments, the RFA approach can look for a single resonance frequency. In some embodiments, an enhanced transmission protocol for the sensed ABS signals to the ECU for analysis by the ECU can result in an increased signal to noise ratio (SNR) for the RFA technique, thereby enabling identification of potential resonance frequencies that might otherwise fall below a conventional noise threshold.

In various embodiments, the sensed data signals can include higher resolution data from the ABS. The different vibration modes can include radial vibration, angular vibration, and other types of tire, wheel or drive train vibrations, as well as higher order harmonics of these vibrations, and can be optimized for RFA of multiple physical variables associated with the tire in addition to tire pressure. Examples of such additional tire variables that can impact different resonance frequency modes include tire speed, temperature, thickness, size, profile, wear, age, and materials, among others. Other non-tire related variables can also be utilized in the RFA and can include ambient conditions; vehicle driving data related to acceleration, turning and braking maneuvers; and vehicle condition parameters including weight, equipment options, and feature settings such as suspension modes or traction control, among others.

In general, wheel speed corresponds to the first order frequency of the sensed signal from the ABS, with the wheel speed corresponding to a duration between pulses. In one embodiment, there are about 48 pulses per rotation, which provides good granularity. Changes in these characteristics can then be analyzed to determine whether any are indicative of a change in the pressure of the tire.

For example, an indirect TPMS can detect a change in resonance frequency of a tire. A decrease of the resonance frequency could be indicative of a lower tire pressure in the tire. Information then can be transmitted from indirect TPMS to other circuitry associated with the TPMS or vehicle ECU in several manners. In one embodiment, the sensed signals and optional non-tire variables and parameters are transmitted to and analyzed by an electronic control unit (ECU). In another embodiment, other kinds of sensed signals and optional non-tire variables and parameters can be communicated to an ECU or other vehicle microprocessor or controller system for utilization in the RFA technique. Any of these signals, variable or parameters, as well as the resonance frequencies of each tire may be communicated to other vehicle microprocessor or controller systems for utilization by the vehicle in other operations and/or display for the vehicle operator.

The RFA performed by the ECU, vehicle microprocessor and/or other controller circuitry can be carried out by a variety of circuit, controller, and microprocessor components that are programmed or configured to perform the RFA as described herein, either in a single component or with various portions of the RFA performed by different components in coordination with each other. The RFA can be performed based on digital data and digital techniques, including the use of a digital signal processor (DSP), analog data and analog techniques, or any combination thereof. In various embodiments, the systems and methods for performing the RFA can accomplish the RFA based on various analysis techniques that can include DSP analysis, auto-regression analysis, discrete Fourier transform, wavelet transform, Gabor transform, Fast Fourier analysis, digital or analog filter banks, a Bayesian analysis, Q factor analysis, harmonic analysis and/or analysis based on a linear estimation model, among others and alone or in combination.

Figure 2:
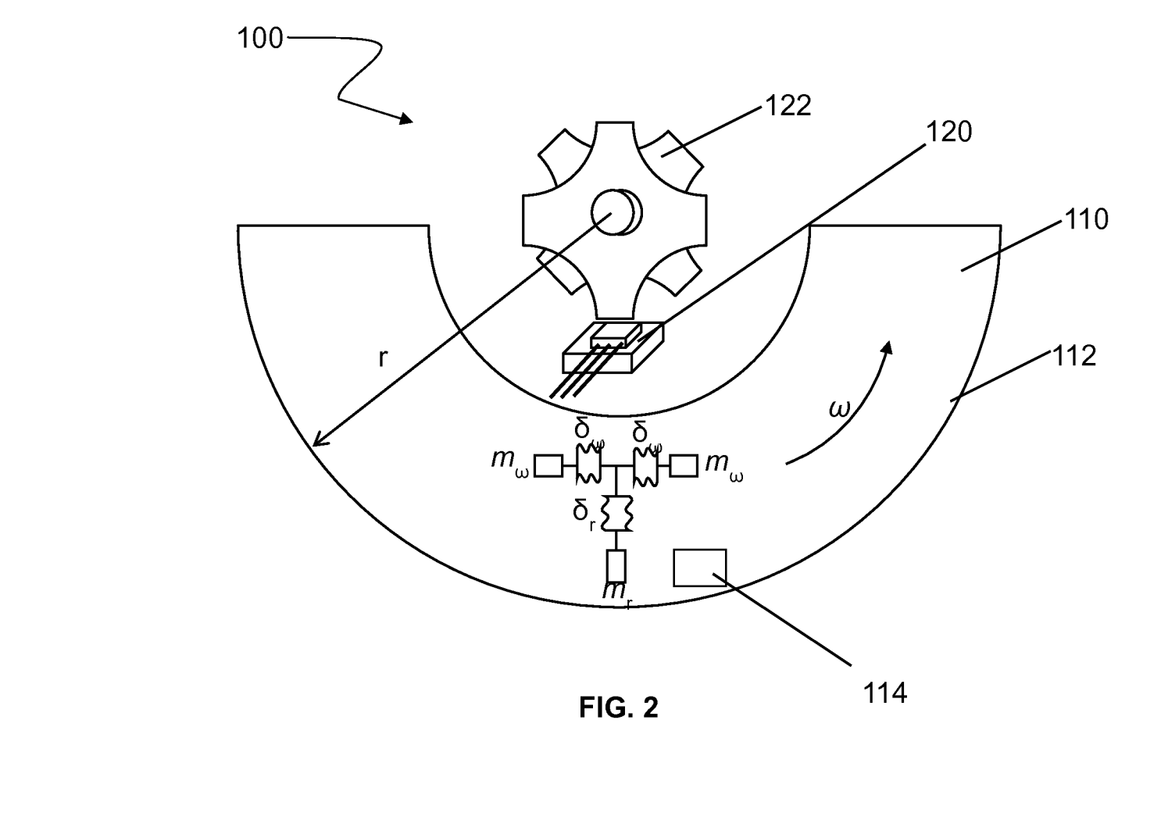
FIG. 2 is a schematic diagram of a wheel sensor system and tire, according to an embodiment.

Referring to FIG. 2, a schematic diagram of an embodiment of an indirect TPMS wheel sensor system 100 that utilizes RFA in accordance with an embodiment is depicted. Wheel 110 is shown with a tire 112 and an ABS system 120. The particular relative positions of ABS system 120 and wheel 110 are merely exemplary and can vary in embodiments. Moreover, components in this and other figures herein are not necessarily drawn to scale. Because wheel 110 is a complex structure, there should be a multitude of resonances in response to complex vibrations occurring during movement. Embodiments utilize these multiple resonances to locate and isolate resonance peaks of different resonance modes, e.g., a radial vibration, r, and an angular vibration, $\omega$. Thus, tire 112 can be modeled as a complex arrangement of mechanical resonators, $\delta_\omega$ and $m_\omega$ for angular vibration, and $\delta_r$ and $m_r$ for radial vibration. In some embodiments, the vibration of tire 112 can be modeled as a two-dimensional model of mechanical resonators, while in other embodiments, tire 112 can be modeled as a three-dimensional model of mechanical resonators.

In some embodiments, the information sensed from the vibrations of the tire 112, such as by one or more sensors 114 mounted in or on, affixed to, embedded in, or otherwise coupled to tire 112, can be analyzed for a multidimensional resonance frequency within the ABS system 120. In other embodiments, one or more sensors 114 can be mounted proximate but not in or on tire 112, such as on a rim, wheel, axle, vehicle body or other suitable place, though sensors so positioned may not be able to sense actual tire characteristics, such as material temperature. In some embodiments, the digitized information can be modulated onto the conventional ABS wheel speed clock signal generated by, for example, an encoder tooth wheel 122, for transmission to and analysis by an electronic control unit (ECU). According to embodiments, additional information about multidimensional resonances of the sensed signal that can include higher-order harmonics of the wheel rotation can be provided to the ECU, which can then be utilized while reducing warning latency, thereby providing a more robust system that balances provision of early warnings with false alarms. In other embodiments, a sensor or series of sensors, rather than components of the indirect TPMS system can be configured to provide the sensed signal(s).

Figure 3:
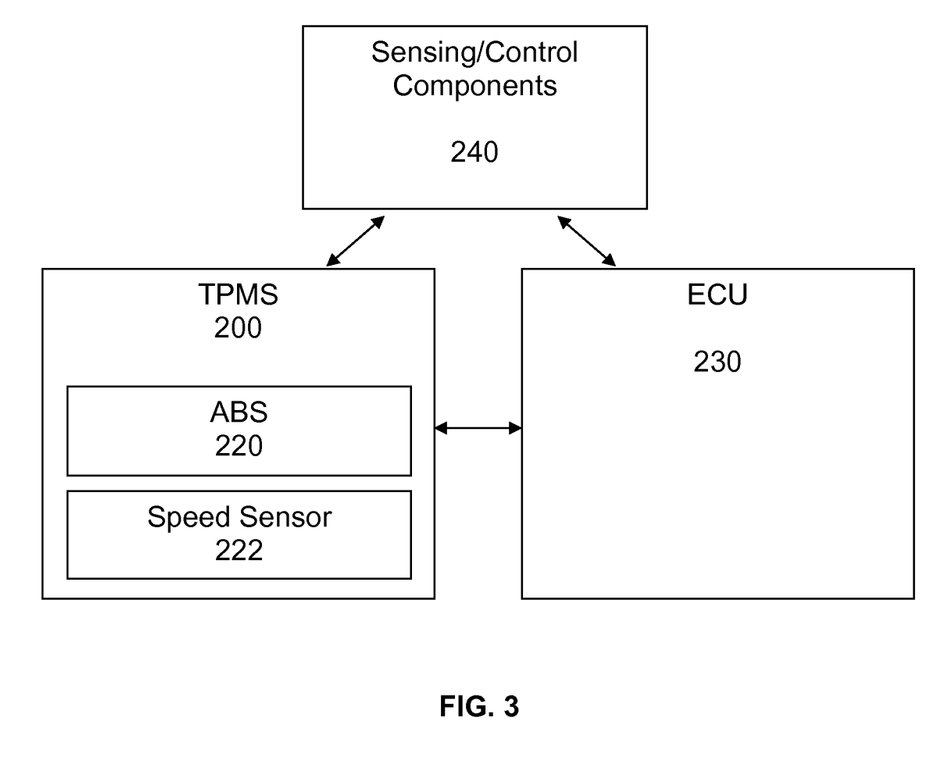
FIG. 3 is a block diagram of an indirect tire pressure monitoring system (TPMS), according to an embodiment.

Referring to FIG. 3, a block diagram is depicted of an indirect TPMS wheel sensor system 200 in accordance with an embodiment. System 200 is or comprises an ABS system 220 including a speed sensor 222 in embodiments. For example, system 200 can comprise an ABS system 220 with additional circuitry and/or algorithms in order to process indirect TPMS data in one embodiment, or system 200 can comprise additional circuitry, algorithms and/or other sense and control components 240 external to ABS system 220 to carry out the processing of the indirect TPMS data. For example, one or more sensors 114 can comprise components 240, or those sensors 114 can be considered to be part of indirect TPMS 200, with or without additional sensors as part of components 240. In one embodiment, the additional circuitry and/or algorithms can be part of an ECU 230 or signal processing system, though they need not be in all embodiments. Various additional data sensing and control system components 240 can also be provided in embodiments and can comprise one or more of an accelerometer sensor and/or system, an inertia sensor or sensor cluster, an ambient environment sensor and/or system and a vehicle control system, each of which can include various sensors and control arrangements known in the art to provide global vehicle parameter data, such as one or more of sensed data, operational data and/or control parameters for the vehicle. In another embodiment, characterization engine 22 can be incorporated into one or more components of wheel sensor system 200, and for example, ECU 230.

Figure 4:
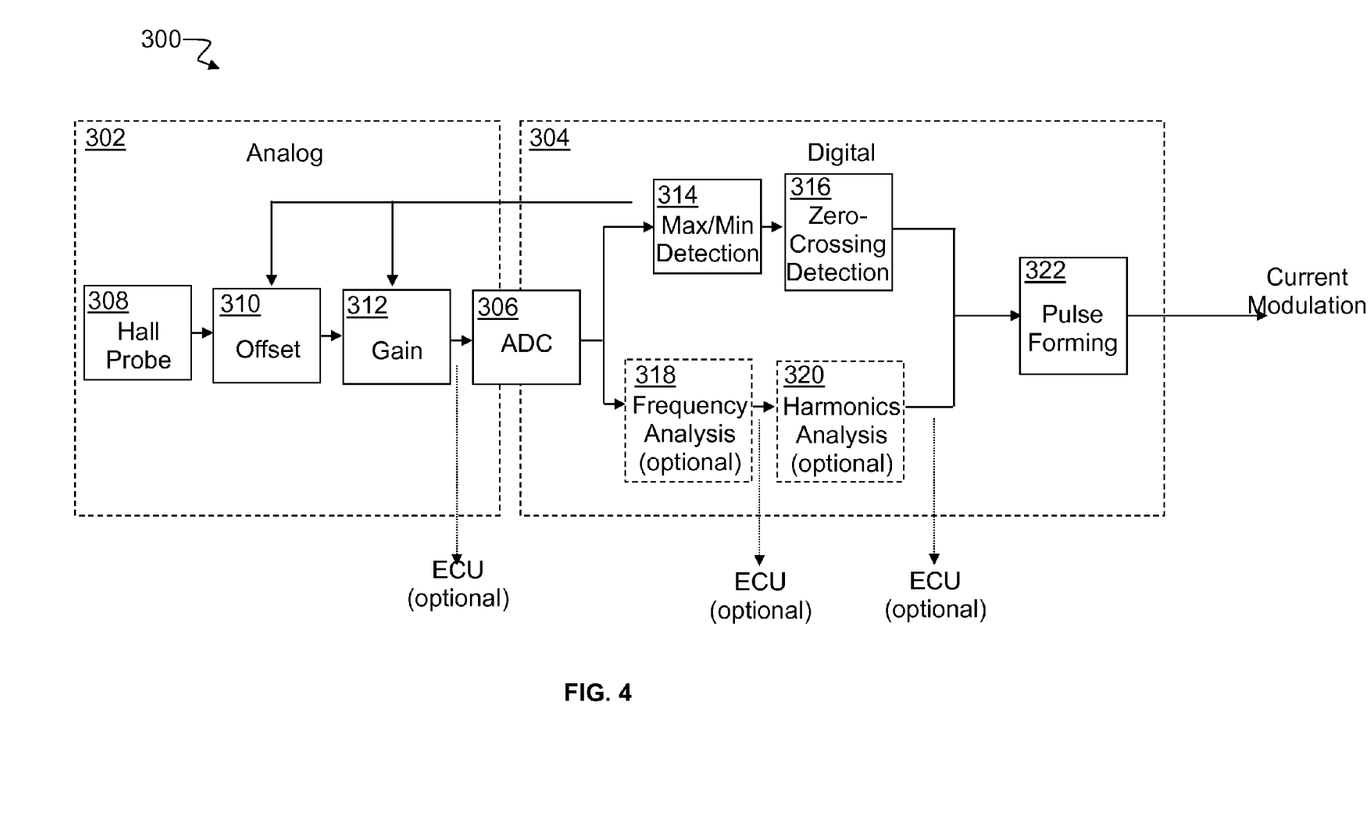
FIG. 4 is a block diagram of an indirect tire pressure monitoring system (TPMS), according to an embodiment.

Referring to FIG. 4, a block diagram of ABS sensor circuitry 300 in accordance with one embodiment is depicted. Circuitry 300 includes an analog portion 302 and a digital portion 304 coupled by an analog-to-digital (ADC) converter 306. Analog portion 302 comprises one or more Hall probes 308 or other magnetic field sensors, offset compensation circuitry 310 and gain circuitry 312. Digital portion 304 comprises maximum/minimum detection circuitry 314, zero-crossing detection circuitry 316, optional frequency analysis circuitry 318, optional analysis of harmonics circuitry 320 and pulse forming circuitry 322. Optional frequency analysis circuitry 318 and analysis of harmonics circuitry 320 form part of an indirect TPMS 324, in an embodiment. If none of the optional analysis or interface options are used, circuitry 300 represents one possible embodiment of a standard ABS system. The depiction of system 300 is merely exemplary, and more or fewer circuitries, sensors and other components can be implemented in other embodiments. Moreover, the block diagram of FIG. 4 can be considered functional, such that some blocks depicted as being distinct can in fact be combined in actual implementation. Additionally, blocks depicted as being part of other blocks can, in other embodiments, be distinct therefrom or be part of other blocks, whether specifically depicted or not.

In one embodiment, information from indirect TPMS 200 is represented in a digital frame protocol format and is modulated onto the original ABS clock signal by adapting the pulse length to the state of the related bit of the frame. Thus, the ABS wheel speed signal is represented by the rising edge while the TPMS information is in the pulse duration of a sequence of pulses. Co-owned and co-pending U.S. application Ser. No. 13/751,335, entitled "A SIGNAL GENERATOR, A DECODER, A METHOD FOR GENERATING A TRANSMIT SIGNAL AND METHODS FOR DETERMINING SPEED DATA," filed Jan. 28, 2013, discloses additional information regarding communicating data between a sensor and an ECU or other control or processing system and is incorporated herein by reference in its entirety. As disclosed therein, a signal generator includes a signal provider and a signal processing unit. The signal provider is configured to provide a sensor signal indicating a repeatedly detected event, occurring within differing time intervals. The signal processing unit is configured to generate a transmit signal based on the sensor signal. The transmit signal includes event information representing the temporal occurrence of the event and additional information representing additional data. The event information includes pulses or signal edges associated to detected events, wherein the pulses or signal edges are temporarily separated within the transmit signal according to the differing time intervals of detected events so that each time interval of the differing time intervals includes one pulse or one signal edge associated with a detected event. Further, the additional data includes at least one frame including a predefined number of additional data bits. The information of the additional data bits of the at least one frame is distributed over at least two time intervals of the differing time intervals.

In one embodiment, information from indirect TPMS 200 is represented in analog form and transmitted as analog information. The magnetic field resulting from a rotating a magnetic pole wheel or magnetic tooth wheel is measured by a speed sensor and converted to a suitable protocol and provided to an ECU as the output signal having a speed data portion and an enhanced resonance data portion. Co-owned and co-pending U.S. patent application Ser. No. 13/903,088 entitled "WHEEL SPEED SENSOR AND INTERFACE SYSTEMS AND METHODS," filed May 28, 2013, discloses additional information regarding communicating data between a sensor and an ECU or other control or processing system and is incorporated herein by reference in its entirety. The speed sensor is herein configured to detect a magnetic field in response to speed and resonance characteristics. The speed sensor is also configured to generate a sensor output signal having speed data and enhanced resonance data which is received by the sensor output signal. The speed signal which is measured in the speed sensor and delivered as analog value can also be used as redundant information to the speed information that is encoded in the speed pulses of the classic ABS protocol. A sensor output signal may be generated having speed data and enhanced resonance data by selecting a first current level and a second current level, generating a magnetic field in response to a rotation that is influenced by tire vibrations, generating a field sensor output from the magnetic field and generating a sensor output signal from the field sensor output according to the selected first current level and the second current level, wherein the sensor output signal includes speed data and enhanced resonance data. A measurement system used in the indirect TPMS may comprise a magnetic field sensor configured to measure a magnetic field and to generate a field sensor output, a summation component configured to combine an offset with the field sensor output to provide a modified sensor output and a current modulation component configured to generate a sensor output signal from the modified sensor output, the sensor output signal having speed data and enhanced resonance data.

In another embodiment, a separate communication source, such as a wired or wireless connection, can be provided between indirect TPMS 200 and ECU 230. For example, a two- or three-wire connection between sensor 222 and/or other sensors of system 200 to ECU 230 can be used, which can provide an amplified and decoupled version of the analog sensor output as it enters ADC 306 or for some other digital signal or message from the ADC 306, FFT (e.g., circuitry 318) or resonance analysis. Several of these optional couplings are depicted in FIG. 4, and in various embodiments one or more of them can be used or omitted, and/or additional ones can be added, such that the particular depiction in FIG. 4 is merely exemplary of one of a variety of possibilities.

Figure 5:
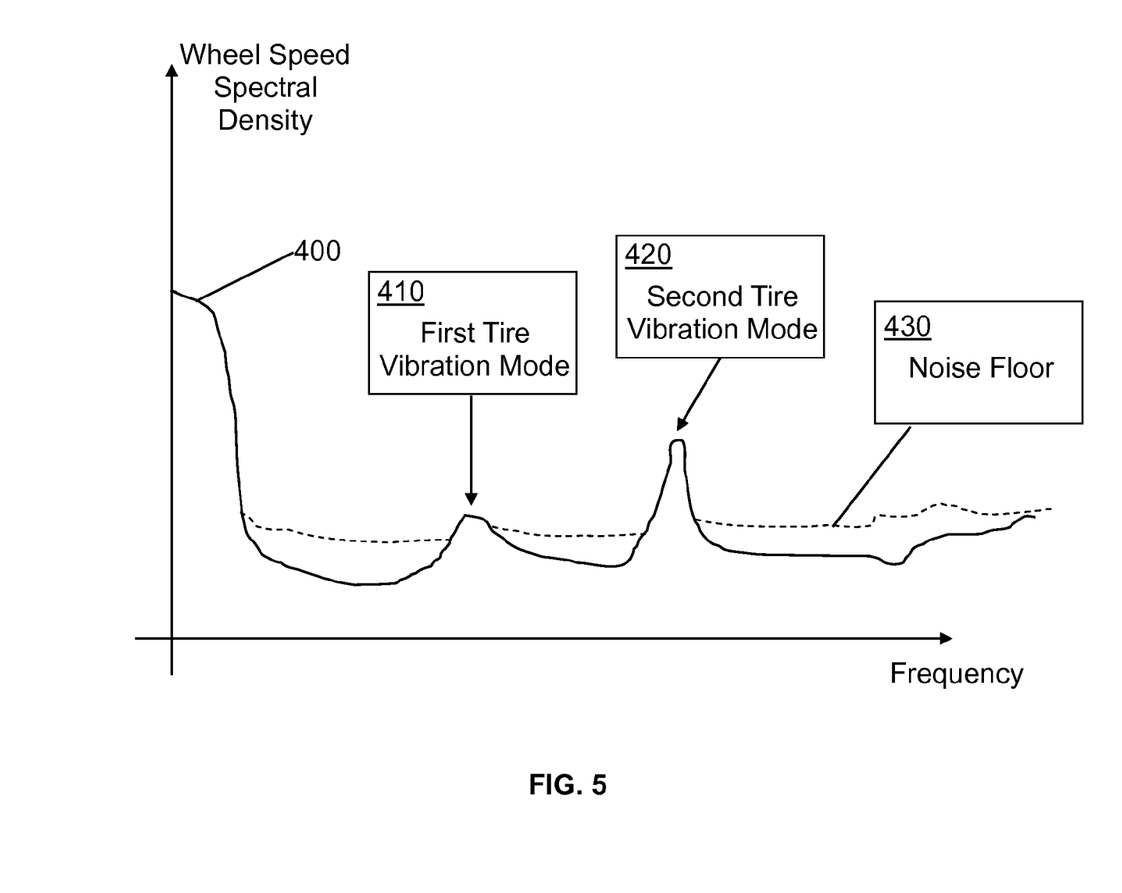
FIG. 5 is a graphical representation of a wheel speed signal spectrum analysis, according to an embodiment.

Referring to FIG. 5, a graphical representation of a spectrum of a wheel speed signal according to an embodiment is shown for the sensed signal data representing wheel speed. Curve 400 represents the wheel speed spectral density based on actual average wheel speed. In this example, curve 400 two tire vibration modes are depicted. A first tire vibration mode is indicated at 410 and a second tire vibration mode is indicated at 420. In this example, the first vibration mode 410 has a weak dependence upon tire pressure and profile thickness, but a stronger dependence upon tire temperature and state of material age. The second vibration mode 420 has a strong dependence upon tire pressure, a strong dependence upon tire temperature, a strong dependence upon profile thickness, but a weak dependence upon state of material age.

In an embodiment, noise floor 430 is shown in dotted line and is higher than the floor of curve 400 of the wheel spectral density. Noise floor 430 illustrates that it can be difficult to recognize the first vibration mode 410 in the spectrum because it is almost covered by the noise. However, second vibration mode 420 is readily recognizable in this spectrum and still can be dependent on pressure and another parameter of interest, as described above. Therefore, second vibration mode 420 can be used to estimate the parameter of interest if, for example, pressure is known from the direct TPMS, such as in direct TPMS 14.

Here instead of using the influence of different parameters on different resonance frequencies, the absolute height of the resonance peaks or the quality factor of the resonance can be taken into account as well, which increases the diversity of the available effects, e.g., the pressure inside the tire can have a higher influence on the location of the resonance frequency while, e.g., the temperature of the rubber could have more influence on the internal friction and therefore cause a significant change of the damping and thus finally on the Q-factor of a resonance. The first resonance 410 is mainly influenced by parameters of the tire (e.g. a deformation that does not significantly change the volume) and therefore shows low pressure dependence but strong temperature dependence, for example. The second resonance is a pressure dependent effect (e.g., deformation of the tire cross-section that changes the volume) and is heavily temperature dependent as well. If at least one measurement in the frequency range of each vibration mode is available, the influencing parameters can be separated by use of equations that describe the dependence of the two measurements on each parameter, and the equations can be resolved for the independent parameters. For example, the strong temperature dependence of both modes 410 and 420 can be removed and the change in pressure isolated between modes 410 and 420. In embodiments, then, the tire pressure measured directly by, for example, sensor 18 of direct TPMS 14 can be included such that the influence of pressure is removed from the resonance analysis.

In other embodiments, additional characteristics can be used to isolate the pressure or other parameters, based on their respective dependence on other characteristics. If the dependence of the measurements on the independent parameters is too complex and/or the pressure cannot be isolated, a numerical meta model of the tire can be established based on a characterization of a tire type over variations of the independent parameters.

Additional analysis or inclusion of additional sensed data or parameters may be used to identify or isolate further vibrational resonance modes in the wheel speed data. For example, different measurements that can be utilized to extract the different influencing parameters could be multitudes or combinations of the following: a) frequency (location) of a resonance of the wheel speed, b) spectral density of the wheel speed at a resonance (maximum), c) spectral density of the wheel speed at a minimum, d) frequency (location) of a minimum, d) spectral density of the wheel speed in a fix distance from a maximum or minimum, e) Q factor of a resonance peak, f) spectral density of the wheel speed at a fix defined frequency, g) any of the previous measurements that are selected depending on the type or dimension of the tire, g) any of the previous measurements that are selected or interpreted depending on the actual speed of the observed wheel, h) any of the previous measurements that are selected or interpreted depending on accessible vehicle parameters (e.g. speed of the car, acceleration, load and its distribution, actuation of vehicle control systems (steering, breaking, power train, vehicle stability control, active damper, global chassis control), i) any of the previous measurements that are selected depending on already acquired measurement points, j) any of the previous measurements selected depending on already evaluated parameters (e.g. tire pressure or tire temperature), and/or k) non-tire related sensed data (e.g., ambient temperature, humidity), in various embodiments.

Based on the new system for the spectral analysis inside the sensor using high resolution data, it can be possible to locate more than just a small pressure dependent change of the analyzed spectrum that exceeds the noise floor. Embodiments, however, are not restricted to being used with a spectral analysis of the sensor device. For example, in other embodiments the noise sensitivity of the generated pulses can be reduced, including significantly, by one or more of the following techniques: reducing a distance between the sensor and pole wheel or other target in order to have a higher anticipated magnetic field strength; providing a stronger magnetization of the pole wheel or other target itself; implementing new or different sensing techniques, such as magnetoresistive (xMR) techniques including tunneling MR, TMR; and/or using higher quality, more precise, or other improved circuitry, though such circuitry may be balanced with, e.g., increased power consumption and other factors. In general, vibrations depend on multiple physical influences, with the tire pressure being only one, and others can include the temperature of the rubber material or the thickness of the profile. Furthermore, there typically is an influence from the aging of the rubber material that changes its flexibility due to a loss of softening plasticizer depending on time and ambient conditions. Since the different resonance modes represent different deformations of the tire during the vibration, it can be assumed that the influence of each parameter on each resonance is different. If multiple resonance effects are identified, these can be used to isolate the influence of the different parameters on tire pressure. In other embodiments, it can be possible to recognize the type of tire by comparison of the multiple resonance effects with known resonance signatures of tires based on size, model, materials and/or manufacturer. Or, conversely, data can be obtained and models built for each tire and/or each tire/vehicle combination and then stored in a memory of system 100 for use during operation.

Referring again to system 10 as depicted in FIG. 1A, characterization engine 12 interfaces with direct TPMS 14 and indirect TPMS 16. In an embodiment, characterization engine 12 is configured to receive tire pressure data from direct TPMS 14, receive data representative of wheel speed of a tire from indirect TPMS 16, analyze the indirect TPMS 16 data to determine a plurality of resonance frequencies associated with the data, incorporate the tire pressure data to remove the influence of pressure on the plurality of resonance frequencies, and calculate one or more tire characteristics based on the plurality of resonance frequencies. In embodiments, other sensor 18 data can be received from direct TPMS 14 in order to eliminate additional influence parameters in the plurality of resonance frequencies.

Figure 1B:
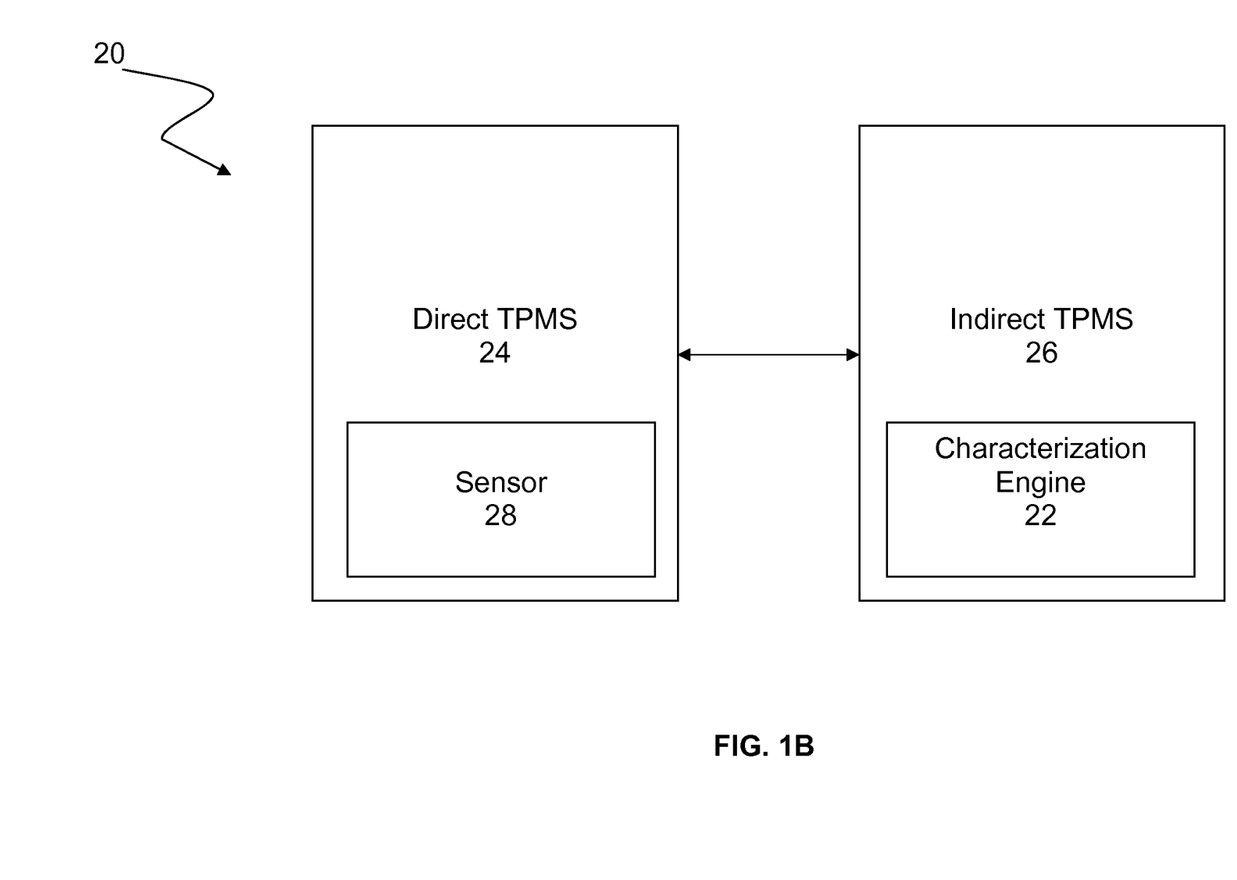
FIG. 1B is a block diagram of a tire characterization system, according to an embodiment.

Referring to FIG. 1B, a block diagram of another embodiment of a tire characterization system 20 that utilizes RFA in accordance with an embodiment is depicted. Characterization system 20 generally comprises a direct TPMS 24 and an indirect TPMS 26. Direct TPMS 24 and indirect TPMS 26 are substantially similar to direct TPMS 14 and indirect TPMS 16 as described above, except that characterization engine 22, which is substantially similar to characterization engine 12, can be implemented as a component of indirect TPMS 26. In such embodiments, indirect TPMS 16 and direct TPMS 24 are configured to interface with each other in order to incorporate the direct measurements of sensor 28 into the system of equations calculated by the RFA analysis of indirect TPMS 26.

Figure 6:
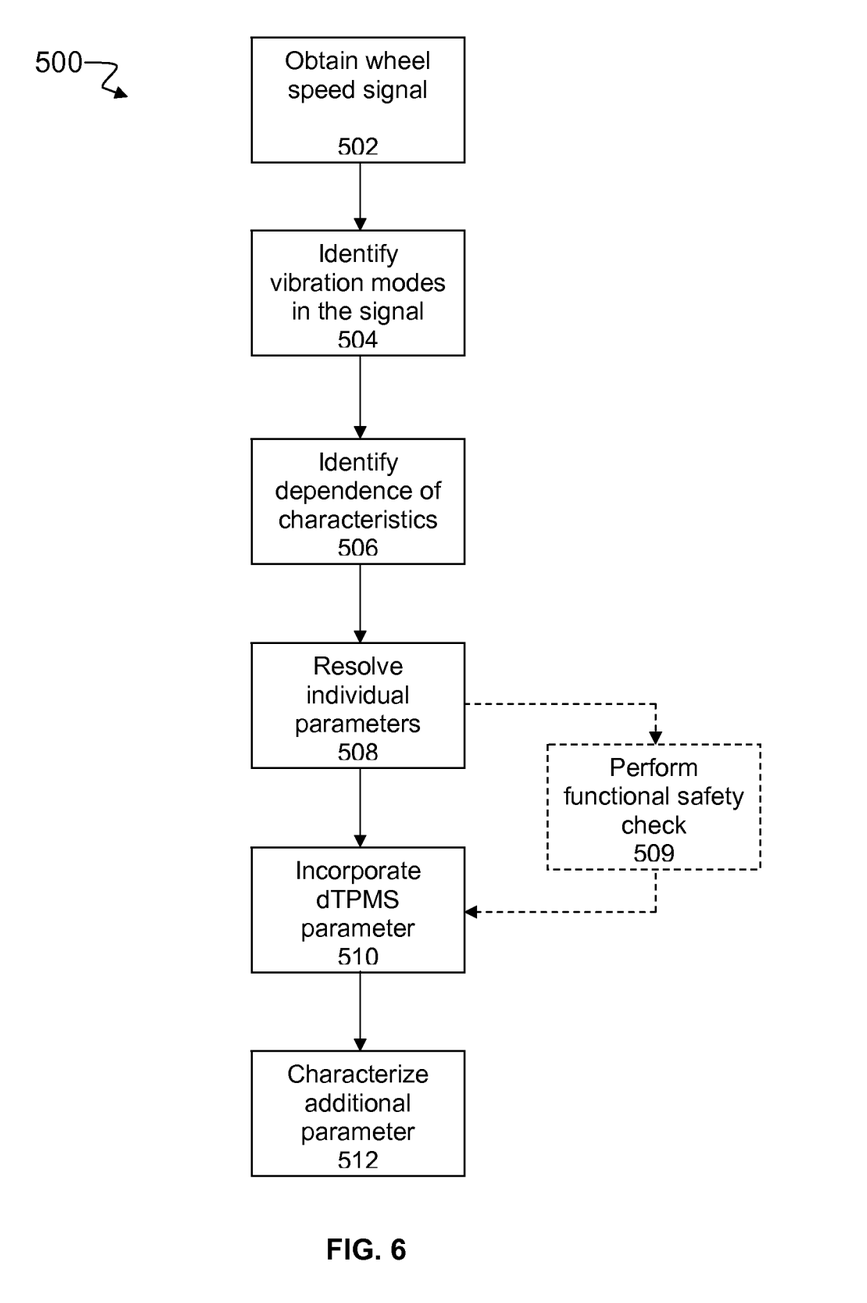
FIG. 6 is a flowchart of a method, according to an embodiment.

Thus, in one embodiment and referring to FIG. 6, a method 500 of characterizing at least one parameter on a vehicle includes obtaining a wheel speed signal at 502. At 504, at least one vibration mode in the wheel speed signal is identified. Then, at 506, one or more characteristics influencing the vibration mode, including at least one characteristic of interest (e.g., tire pressure), are identified and, at 508, resolved to isolate at least one individual parameter of interest. For example, an unknown (without incorporation of direct TPMS data) parameter that influences the resonance can be isolated. In embodiments, at least two vibration modes in the wheel speed signal are identified.

In an optional embodiment, at 509, a functional safety check can be performed. In an embodiment, the preliminarily-resolved at least one individual characteristic of interest can be compared to its corresponding direct measurement for validity analysis or other analysis check or confirmation in order to determine the reasonableness of the corresponding direct measurement. If the direct measurement is determined to be unreasonable compared to the preliminarily-resolved characteristic of interest, the indirect TPMS can proceed to an error state or otherwise abort the instant calculation. If the direct measurement is determined to be reasonable compared to the preliminarily-resolved characteristic of interest, the method 500 of characterizing can proceed to 510. For example, the direct TPMS tire pressure can be verified as consistent or reasonable with an indirect TPMS tire pressure estimate and be incorporated into the method 500 of characterizing. If inconsistent or unreasonable, the direct TPMS tire pressure can be unincorporated or trigger the method to proceed to an error state, as appropriate. In an embodiment, reasonableness or unreasonableness can be determined by an absolute value difference. In other embodiments, other difference calculations can be performed. In an embodiment, therefore, the direct TPMS system provides redundancy with the indirect TPMS system.

At 510, the one or more direct measurements from sensor 18 of direct TPMS 14, for example, in system 10 of FIG. 1A, can be incorporated into the system of equations for the isolated at least one individual parameter of interest. For example, the direct tire pressure measurement can be input for the resolved at least one characteristic of interest. At 512, one or more additional parameters can then be characterized after the inclusion of the one or more direct measurements. The one or more additional parameters can be characterized based on, for example, analysis of the characteristics influencing the vibration modes. In one embodiment, the influence of the various characteristics can be derived by a system of equations. In other embodiments, additional sensor signals and information can be used, e.g., other signals considered at 502.

In a feature and advantage of embodiments, systems and methods can estimate one or more parameters of a tire that would not be accessible in a RFA analysis without a direct TPMS measurement or measurements. For example, in an embodiment, the temperature of the tire material can be estimated, wherein it is typically difficult to directly measure such material. In other embodiments, other tire parameters can be estimated, such as state of material age or profile thickness.

In another feature and advantage of embodiments, systems and methods allow for the comparison of RFA-estimated parameters (from, for example, an indirect TPMS) against an actual measured parameter (from, for example, a direct TPMS). Such comparison can be useful as part of a failure analysis or functional safety analysis, for example.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A tire characterization system comprising:
a sensor configured to provide a wheel speed signal;
a direct tire pressure monitoring system (TPMS) including at least one sensor configured to provide a direct measurement of a characteristic of the tire; and
a characterization engine configured to process the wheel speed signal to identify at least one tire vibration mode and use the identified at least one tire vibration mode and the direct measurement to estimate a characterized parameter of the tire.

2. The tire characterization system of claim 1, wherein the sensor configured to provide a wheel speed signal is a component of an indirect tire pressure monitoring system (TPMS).

3. The tire characterization system of claim 1, wherein processing the wheel speed signal comprises using a resonance frequency analysis (RFA) that includes a spectral analysis for identifying the at least one tire vibration mode in the wheel speed signal that depends on at least two unknown parameters of the tire, and
wherein processing the direct measurement comprises removing at least one of the unknown parameters in order to estimate the characterized parameter, the characterized parameter being a non-measured unknown parameter that influences the resonance.

4. The system of claim 2, further comprising:
an antilock braking system (ABS) configured to provide the wheel speed signal; and
an electronic control unit (ECU) coupled to the ABS and configured to process the sensed wheel speed signal, wherein at least one of the characterization engine or the indirect TPMS is a component of the ECU.

5. The system of claim 3, wherein the sensor is a pressure sensor.

6. The system of claim 5, wherein the unknown parameter is tire pressure and the characterized parameter is tire material temperature.

7. The system of claim 3, wherein the characterization engine is further configured to isolate a second unknown parameter that influences the resonance and process the direct measurement to remove the second unknown parameter.

8. The system of claim 7, wherein the unknown parameter is tire pressure, the second unknown parameter is tire material temperature, and the characterized parameter is one of state of material age or tire profile thickness.

9. The system of claim 3, wherein the characterization engine is further configured to compare the removed at least one unknown parameter to the corresponding direct measurement in order to determine a reasonability of the direct measurement prior to estimation of the characterized parameter.

10. A method of characterizing at least one parameter of a vehicle tire, the method comprising:
obtaining data representative of a wheel speed of the tire;
analyzing the data;
obtaining a direct measurement from at least one sensor corresponding to the unknown parameter;
incorporating the direct measurement into the analyzed data to remove the unknown parameter; and
characterizing one or more additional parameters of the vehicle tire.

11. The method of claim 10, wherein analyzing the data comprises using a signal processing system to determine at least one resonance frequency associated with the data,
wherein the method further comprises analyzing the at least one resonance frequency using the signal processing system to isolate an unknown parameter, and
wherein incorporating the direct measurement into the analyzed data comprises incorporating the direct measurement into the at least one resonance frequency.

12. The method of claim 11, wherein the at least one sensor is a pressure sensor, and wherein the unknown parameter is tire pressure and the characterized parameter is tire material temperature.

13. The method of claim 11, wherein obtaining data representative of wheel speed of the tire comprises extracting data from an antilock braking system (ABS) for a tire.

14. The method of claim 11, further comprising:
analyzing the at least one resonance frequency to isolate a second unknown parameter;
obtaining a second direct measurement from a second at least one sensor corresponding to the second unknown parameter; and
incorporating the second direct measurement into the at least one resonance frequency to remove the second unknown parameter.

15. The method of claim 14, wherein the unknown parameter is tire pressure, the second unknown parameter is tire material temperature, and the characterized parameter is one of state of material age or tire profile thickness.

16. The method of claim 10, wherein the method is implemented by at least one of an electronic control unit (ECU) or a characterization engine.

17. The method of claim 11, further comprising comparing the unknown parameter to the direct measurement in order to determine a reasonability of the direct measurement.

18. A tire characterization system comprising:
at least one sensor configured to provide at least a direct measurement of a characteristic of the tire;
an wheel speed sensor configured to provide a wheel speed signal; and
an electronic control unit (ECU) coupled to the wheel speed sensor and configured to
process the sensed wheel speed signal, to identify at least one tire vibration mode, and
process the direct measurement and the identified at least one tire vibration mode in order to estimate a characterized parameter of the tire.

19. The tire characterization system of claim 18, wherein processing the sensed wheel speed signal comprises using a resonance frequency analysis (RFA) that includes a spectral analysis identifying the at least one tire vibration mode in the wheel speed signal,
wherein the ECU is further configured to isolate at least one unknown parameter that influences a resonance, and
wherein processing the direct measurement comprises removing the at least one unknown parameter in order to estimate the characterized parameter that influences the resonance.

20. The tire characterization system of claim 19, wherein the at least one sensor is a pressure sensor, and wherein the unknown parameter is tire pressure and the characterized parameter is tire material temperature.

* * * * *